United States Patent [19]

Hlatky

[11] Patent Number: 5,300,596

[45] Date of Patent: Apr. 5, 1994

[54] REDUCTION OF α-OLEFIN-CARBON MONOXIDE COPOLYMERS TO POLYALCOHOLS WITH BOROHYDRIDE SALT

[76] Inventor: Gregory G. Hlatky, 1114 Indian Autumn, Houston, Tex. 77062

[21] Appl. No.: 726,615

[22] Filed: Jul. 8, 1991

[51] Int. Cl.$^5$ .............................................. C08G 67/02
[52] U.S. Cl. ................................... 525/539; 528/392; 528/490
[58] Field of Search ................ 525/539; 528/392, 490

[56] References Cited

U.S. PATENT DOCUMENTS

| | | |
|---|---|---|
| 2,495,286 | 1/1950 | Brubaker et al. |
| 3,694,412 | 9/1972 | Nozaki . |
| 4,076,911 | 2/1978 | Fenton . |
| 4,818,810 | 4/1989 | Drent . |
| 4,835,250 | 5/1989 | Drent . |
| 4,868,254 | 9/1989 | Wong . |
| 4,929,701 | 5/1990 | van Broekhoven . |

FOREIGN PATENT DOCUMENTS 57-015907-B4  4/1982  Japan .

OTHER PUBLICATIONS

Y. Morishima et al., European Polymer Journal, vol. 9, pp. 669–675 (1973 "Synthesis, Structure and Some Properties of a New Polyalcohol".

Lai and Sen, Organometallics, vol. 3 (1984), pp. 866–870 "Copolymerization of Carbon Monoxide with Ethylene. Direct Evidence for a Single Mode of Chain Growth."

Columbo et al., Journal of Polymer Science, Part A1, vol. 4 (1966), pp. 29–57 "Co(60) Gamma-Radiation-Induced Copolymerization of Ethylene and Carbon Monoxide".

Brubaker et al., Journal of American Chemical Society, vol. 74, (1952), pp. 1509–1515 "Synthesis and Characterization of Ethylene/Carbon Monoxide Copolymers, a New Class of Polyketones".

*Primary Examiner*—Harold D. Anderson
*Attorney, Agent, or Firm*—Catherine L. Bell

[57] ABSTRACT

This invention relates to a process of reducing polyketones to polyalcohols using borohydride salts where the reducing agent is suspended in water.

9 Claims, No Drawings

REDUCTION OF α-OLEFIN-CARBON MONOXIDE COPOLYMERS TO POLYALCOHOLS WITH BOROHYDRIDE SALT

FIELD OF INVENTION

This invention relates to the reduction of α-olefincarbon monoxide copolymers in water using borohydride salts.

BACKGROUND OF THE INVENTION

The existence of copolymers of carbon monoxide with olefins, especially ethylene, is well known in the prior art. The copolymerization of ethylene and carbon monoxide using free radical initiators has been described by Brubaker et al. (U.S. Pat. No. 2,495,286) Furthermore, copolymerization of ethylene and carbon monoxide initiated by gamma-irradiation has been claimed by Columbo et al. in Journal of Polymer Science, Part Al, Vol. 4 (1966) p. 29. These methods produce polymers with carbon monoxide contents ranging from less than 1% to as much as 50%.

Linear alternating copolymers and terpolymers of carbon monoxide and α-olefins, especially ethylene (ECO), having the general formula $[-(CO)(ol)-]_n$, where ol are α-olefin monomers, have been prepared using transition metal complexes as described by Nozaki (U.S. Pat. No. 3,694,412), Fenton (U.S. Pat. No. 4,076,911), Lai and Sen (Organometallics, Vol. 3 (1984) p. 866) and Drent (U.S. Pat. Nos. 4,818,810 and 4,835,250).

Reduction of α-olefin-carbon monoxide copolymers produces polyalcohols. Polyalcohols can be cast or extruded into films and used as adhesives or coatings for paper. Polyalcohols also show a a high degree of barrier properties. This is of advantage in packaging for food, drug and cosmetics, which usually undergo oxidative degradations when exposed to air.

Polyalcohols such an ethylene-vinyl alcohol (EVOH) are generally produced by hydrolysis of ethylene-vinyl acetate copolymers (EVA), not reduction of α-olefin copolymers. Polyalcohols produced from α-olefin-carbon monoxide copolymers have a number of advantages over EVOH produced from the hydrolysis of EVA. These are:

1) carbon monoxide is a less expensive feedstock than vinyl acetate;
2) hydrolysis of EVA to EVOH results in the formation of acetate salts as byproducts (actate salt byproduct are not formed when α-olefin CO copolymers are reduced);
3) Reduction of linear, alternating α-olefin-carbon monoxide copolymers produces polyalcohols of highly regular structures (EVOH produced by the hydrolysis of EVA does not produce highly regular structures);
4) polyalcohols made by the reduction of alternating ECO copolymers have a greater density of hydroxyl groups (I) than EVOH made from EVA (II):

Furthermore, polyalcohols represented by formula I from alternating ECO copolymers have high molecular purity and higher stability than those represented by formula II due to the structural inability of polyalcohols represented by formula I to dehydrate to conjugated dienes, as those represented by formula II are known to do.

Two principal methods have been used for the reduction of these carbon monoxide copolymers to polyalcohols. One is hydrogenation using a transition-metal catalyst. Brubaker et al. (Journal of the American Chemical Society, Vol. 74 (1952) p. 1509) and van Broekhoven (U.S. Pat. No. 4,929,701) describe the use of copper chromite or nickel catalysts to reduce polyketones to polyalcohols. However, the high temperatures and pressures used in this process can result in dehydration of CO-rich copolymers to 2,5-tetrahydrofurandiyl functionalities, which have inferior barrier properties. Furthermore, Wong et al. in European Patent Application 0 322 976 (1988) teach the hydrogenation of polyketones using nickel salts reacted with borohydrides as catalysts.

It is, of course, well known that borohydride salts can be used to reduce ketones to alcohols under mild conditions. There are a number of examples in the prior art of the reduction of polyketones like ECO by borohydride salts. JP 82-015907-B4 uses hydrogenated boron sodium, presumably sodium borohydride. Morashima et al. (European Polymer Journal, Vol. 9 (1973) p. 669) also used sodium borohydride in methanol. Wong et al. (European Patent Application 0 322 976) and Wong (U.S. Pat. No. 4,868,254) prefer reductions of α-olefin-carbon monoxide copolymers by sodium borohydride in hexafluoroisopropanol or m-cresol.

All these examples imply or teach that polyketone reductions by borohydride require the use of alcoholic media so that the starting polyketone and/or the product polyalcohol may dissolve. There are a number of disadvantages, however, in carrying out these reactions in alcohols. Common borohydride salts such as sodium borohydride react with alcohols to form tetraalkoxy- or tetraaryloxyborates. This type of decomposition is particularly rapid in methanol. Ethanol or isopropanol react more slowly with sodium borohydride, but the solubility of the borohydride in these solvents is low (respectively 4 and 0.25 grams per 100 ml of solvent), resulting in large amounts of effluent after the reduction. Other solvents, such as hexafluoroisopropanol or m-cresol, are toxic and expensive.

In light of the deficiencies described, the need for an improved process for the reduction of α-olefin-carbon monoxide copolymers and terpolymers which uses an inexpensive, non-toxic solvent in which the reducing agent is both highly soluble and stable is deemed readily apparent.

SUMMARY OF THE INVENTION

The present invention uses water instead of alcohols as the medium of choice for reducing polyketones to polyalcohols with borohydrides salts.

Water has rarely, if ever, been the medium of choice for conducting reductions of ketones. While its cost is negligible with respect to alcohols, water has been eschewed for these reductions because it is a poor solvent for most organic substrates and products. Furthermore it is a commonly held belief that borohydride salts are unstable, indeed explosively so, in water. The warning labels on bottles of sodium or potassium borohydride are indicative of this.

However, in a practical sense certain borohydride salts, especially those of the Group I metals, display a surprising degree of stability in water. While sodium borohydride decomposes in methanol even at $-40°$ C., it can be dissolved in cold water without appreciable decomposition and can be isolated as a dihydrate. Similarly, potassium borohydride is stable to moist air. Only in acidic conditions or at elevated temperatures do these compounds undergo extensive decomposition. The high degree of solubility of these compounds is a further advantage: at 20° C. NaBH$_4$ has a solubility in water of 55 grams per 100 ml of solvent. This greater solubility means reactions can be carried out in more concentrated solutions thereby avoiding excessive amounts of effluents.

The present invention comprises the reduction of a finely ground polyketone suspended in water by a borohydride salt, stirring for a sufficient time to effect the reduction and recovering the polyalcohol product. The present invention differs from previously described polyketone reductions using borohydride salts in alcoholic media in that neither the starting polyketone nor the polyalcohol product are soluble in water.

DETAILED DESCRIPTION OF THE INVENTION

The present invention uses water as the medium of choice for reducing polyketones to polyalcohols using borohydride salts, preferably those of the Group IA metals. This process is used to reduce alpha-olefin carbon monoxide copolymers to polyalcohols, especially ethylene-carbon monoxide copolymers of the formula $(-(CO)_x(CH_2-CH_2)_y-)_n$ to ethylene-vinyl alcohol type copolymers of the formula $(-(CH(OH))_x(CH_2-CH_2)_y-)_n$ where $0 < x \leq y$ and x and y are integers. These polymers are generally alternating copolymers when x and y are approximatly equal. When x and y are not approximatly equal, the hydroxyl units are typically not adjacent to one another.

The present invention is practiced by first suspending the polyketone in water. Reductions can be carried out on polyketones containing from about 1 to 50 mole % carbonyl groups, preferably about 30 to 50 mole % carbonyl groups. Since neither the starting polyketone nor the product polyalcohol are soluble in water, it is preferable to increase the surface area of the polyketone by grinding. A mesh of 2 to 60 or finer is preferred, with a mesh of 20 to 60 or finer being more preferred and a mesh of 20 or finer being most preferred as defined by A.S.T.M. Standard E-11.

To this suspension is then added an aqueous solution of a borohydride salt, preferably one of the Group IA (sodium or heavier metal) or Group IIA (calcium or heavier metal), more preferably sodium or potassium borohydride, even more preferably potassium borohydride. The borohydride salt is dissolved in neutral (distilled) to basic water of a pH between 7 and about 10. More acidic solutions will decompose the borohydride while too basic a solution (viz. 10% aqueous sodium hydroxide) tends to inhibit reduction.

The borohydride reagent should be used in excess. At least 1.5 grams and preferably 2 grams or greater of borohydride should be used per gram of polyketone (i.e., ratios between 1.5:1 to 2.5:1 are preferred with a ratio of 2:1 or greater being more preferred). Larger ratios may be used without detrimental effect, but such excesses are not deemed necessary. The mixture is stirred and allowed to for 1 to 48 hours, more preferably 12 to 24 hours and even more preferably from 16 to 20 hours. Suitable temperatures are from about 10° C. to about 40° C., preferably ambient room temperature. Temperatures greater than about 40° C. are not recommended as the borohydride is more rapidly decomposed at elevated temperatures. A reaction pressure which maintains the liquid phase, preferably atmospheric pressure, is used.

Once the reaction time is completed, the reaction is acidified to hydrolyze the excess borohydride. The acidification may be accomplished by any process known in the art, such as adding aqueous hydrochloric acid to the solution until it is weakly acidic.

After acidification to hydrolyze excess borohydride, the product may be purified by methods well known in the art. Vacuum drying, azeotropic distillation of excess water, or dissolution and reprecipitation of the polyalcohol are acceptable, this last method being preferred. In a preferred embodiment of this last method, the polyalcohol is dissolved in methanol and is precipitated using a non-aqueous solvent in which the polyalcohol is insoluble with acetone being most preferred.

The foregoing invention now having been described, the following illustrative, but non-limiting, examples are presented to teach further the preferred embodiment and best modes for practicing the described invention and to aid others in the practice of the scope of the invention herein provided.

EXAMPLES

Example 1

In this example, an ethylene-carbon monoxide copolymer was reduced to a polyalcohol by potassium borohydride. A copolymer comprising 44 mole % carbon monoxide and 56 mole % ethylene (12.2 g) was ground to 20 mesh and stirred in distilled water (300 ml) for 5 minutes. To this was added a solution of potassium borohydride (24 g) in water (200 ml). The effervescent mixture was stirred at room temperature for 18 hours.

The reaction time was completed, concentrated aqueous hydrochloric acid was added to the rapidly stirred mixture until the aqueous phase was slightly acidic. After stirring for an additional 5 minutes, the water was decanted and the solid twice stirred in water (200 ml) for 30 minutes. The product was twice stirred in acetone (200 ml), filtered off and dried in a vacuum desiccator. Further purification was achieved by stirring the product in dry methanol (200 ml) for 1 hour and precipitating with acetone (200 ml). The product was filtered off and dried in vacuo. The yield of polyalcohol was 10.6 grams.

Example 2

In this example, a copolymer comprising 44 mole % carbon monoxide and 56 mole % ethylene (5 g) was reduced to a polyalcohol by sodium borohydride (10 g) in water (250 ml) using the procedure of Example 1. The yield of polyalcohol was 1.6 grams.

As is apparent from the foregoing description, the materials prepared and the procedures followed relate to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention by limited thereby.

I claim:

1. A process for the reduction of alpha-olefin/carbon monoxide copolymers to polyalcohols consisting essentially of:

1) suspending an alpha-olefin/carbon monoxide copolymer in water,
2) adding a borohydride salt to the suspension, and
3) recovering the polyalcohol product.

2. The process of claim 1, wherein the carbon monoxide copolymer has from about 1 mole % to 50 mole % carbonyl units.

3. The process of claim 1, wherein the carbon monoxide copolymer is a copolymer of ethylene and carbon monoxide.

4. The process of claim 1, wherein carbon monoxide in said carbon monoxide copolymer is present at about 30 mole % to 50 mole %.

5. The process of claim 1 wherein the carbon monoxide copolymer is ground to a mesh of between 2 and 60.

6. The process of claim 1, wherein the borohydride salt is sodium borohydride or potassium borohydride.

7. The process of claim 1, wherein the carbon monoxide copolymer is ground to a mesh of 20 or finer.

8. The process of claim 1, wherein the gram(s) of borohydride salt are present in a ratio of 2.0:1 or greater to gram(s) of carbon monoxide copolymer.

9. The process of claim 1, wherein the gram(s) of borohydride salt are present in a ratio between 1.5:1 and 2.5:1 to gram(s) of carbon monoxide copolymer.

* * * * *